United States Patent Office 3,315,000
Patented Apr. 18, 1967

3,315,000
SULFUR COMPOUNDS FROM ALLENE
Derek L. Ransley, Berkeley, Calif., assignor to Chevron Research Company, a corporation of Delaware
No Drawing. Filed Nov. 6, 1963, Ser. No. 321,675
4 Claims. (Cl. 260—609)

The present invention is directed to a process for the production of saturated bis-hydrocarbylthiopropane-1,3 compounds. More particularly, it is directed to the production of saturated bis-hydrocarbylthiopropane-1,3 compounds having more than 5 and less than 19 carbon atoms per hydrocarbyl group.

In the process of the present invention, saturated hydrocarbyl thiols having at least 6 carbon atoms per hydrocarbyl group are contacted under autogenous pressure with allene in the presence of an inert organic liquid diluent under liquid phase free radical reaction conditions. Under these conditions, bis-hydrocarbylthiopropane-1,3 compounds are produced which are essentially free of the isomeric compounds bis-hydrocarbylthiopropane-1,2.

By saturated hydrocarbyl thiols is meant all thiols, i.e., mercaptans, having at least 6 and less than 19 carbon atoms per hydrocarbyl group, including alkyl, cycloalkyl, alkylcycloalkyl and cycloalkylalkyl groups. Representative groups are n-hexyl, cyclohexyl, sec.-octyl, stearyl, dodecyl, undecyl, cyclo-octyl, cyclododecyl, 2-ethylhexyl, 4-methylcyclohexyl, n-$C_{18}H_{37}$ and the like. Slightly and highly branched-chain alkyl groups are also included. All these hydrocarbyl groups have in common necessary chemical characteristics making them suitable groups as thiol components. They are essentially inert to chemical free radical attack under the present process conditions. As components of the thiol, in combination with the sulfhydro group, —SH, they yield thiols which are capable of forming solutions in inert diluents, and the groups are thermally stable under the present process conditions.

By inert organic liquid diluents is meant those relatively unreactive solvents such as alkanes, aromatic hydrocarbons, benzene, chlorobenzene, cyclohexane, heptane, octane, and the like, which do not chemically interact with allene and free radical precursor catalysts under the present process conditions. That is, no appreciable amount of solvent molecules becomes a component of the compounded products under reaction conditions.

By liquid phase free radical reaction conditions is meant contacting a liquid mixture of thiol and allene or preferably allene and thiol feed in the presence of an inert liquid diluent under catalyst free radical generating conditions including thermal dissociation of known organic free radical precursor compounds such as organic peroxidic and organic azo compounds, as well as free radical generation in the reaction medium by irradiation by radiant energy including high energy, high frequency vibrational means, light, electron bombardment and the like.

In general, suitable reaction temperatures are in the range from below about 150° C., to just above the temperature of the melting point for the particular reaction system. Preferably, reaction temperatures below about 100° C. are employed. More desirably, temperatures of about 50–60° C. are employed.

Representative free radical precursor compounds are azobis-isobutyronitrile, benzoyl peroxide, di-tertiary butyl peroxide, cumene hydroperoxide, methyl ethyl ketone hydroperoxide, lauroyl diacylperoxide, t-butylperacetate, t-butylperbenzoate, di-t-butyldiperthalate and the like, that is, known organic peroxidic compounds capable of thermal dissociation at temperatures below 150° C., thereby yielding free radical fragments capable of initiating free radical n-hexyl thiol addition to n-hexene-1. In general, from about 1 to 10 mol per cent (based on thiol) of the free radical precursor compound are required.

In a preferred embodiment of the present process, benzene and the desired thiol are charged to an autoclave in which the relative volume relationship of benzene to thiol employed is about 0.5–10 volumes of benzene for each volume of the thiol. In addition, allene in an amount such that the mol ratio of thiol to allene is preferably about 2:1, which corresponds to stoichiometric requirements, and from about 1–4% (based on thiol) of a free radical reaction catalyst, for example, azobis-isobutyronitrile, are charged to the autoclave. Under autogenous pressure and at a temperature of about 50° C., reaction commences as shown by a drop in the autoclave pressure. When the autoclave pressure becomes relatively stabilized, an increase of temperature, for example, to 65° C. and higher, usually serves to drive the reaction farther towards completion. In general, reaction periods of from 0.5–10 hours are adequate but may vary depending upon the particular feed, its purity and the particular free radical initiator means employed. In any event, the reaction is best and most conveniently monitored by following the pressure change. In general, and because the products are stable compounds, recoveries by distillation are most convenient.

In the above manner, the reactions listed in Table I following were carried out with the resulting product distribution being as noted:

TABLE I.—CONDITIONS AND PRODUCT DISTRIBUTION FROM THE REACTION OF ALLENE WITH MERCAPTANS

| Examples | RSH | RSH, Mols | Allene, Mols | AIBN, Percent | Time, Min. | Yield [a], Percent | Product Distribution [b] | | | |
|---|---|---|---|---|---|---|---|---|---|---|
| | | | | | | | I | II | III | IV |
| 1 | $CH_3(CH_2)_5$— | 0.178 | 0.075 | 2.0 | 140 | 96.9 | 20.0 | None | 76.9 | None. |
| 2 | $CH_3(CH_2)_7$— | 0.198 | 0.150 | 3.1 | 210 | 87.5 | 52.5 | do | 35.0 | Do. |
| | | 0.087 | 0.150 | 5.0 | 90 | 90.4 | 52.9 | do | 37.5 | Do. |
| 3 | $CH_3(CH_2)_9$— | 0.238 | 0.125 | 2.6 | 210 | 85.0 | | do | 85.0 | Do. |
| 4 | $CH_3(CH_2)_{11}$— | 0.198 | 0.100 | 3.1 | 240 | 93.0 | | do | 93.0 | Do. |

[a] Yield based on thiol reacted.
[b] Product I: R—S—$CH_2$—CH=$CH_2$, monoadduct.
Product II: R—SCH($CH_3$)=$CH_2$, monoadduct.
Product III: $R_2$(—$SCH_2CH_2CH_2S$—), diadduct.
Product IV: $R_2$(SCH($CH_3$)$CH_2$S), diadduct.

From the above data, the following conclusions are in order:

(1) Saturated hydrocarbyl thiols are convertible essentially quantitatively to saturated bis-hydrocarbyl thiopropane-1,3 compounds.

(2) Desirably, the relative mol ratio of thiol to allene is of the order of 2:1; otherwise, some monoadduct is produced which must be recycled for quantitative conversion, or excess thiol must be recovered and recycled.

(3) Higher molecular weight thiols react with allene substantially with the same facility as lower molecular weight analogues.

When secondary, $R_2CHSH$, and tertiary, $R_3CSH$, saturated hydrocarbyl thiols are substituted for the representative primary thiols, $RCH_2SH$, of the above examples, the corresponding saturated bis-sec.- and t-hydrocarbylthiopropane-1,3 compounds result.

Characterization of the above-noted products was by conventional means and by the use of nuclear magnetic resonance (NMR) and infrared (IR) spectra. The data are listed in Tables II and III. Further confirmatory evidence was obtained by mass spectrographic cracking patterns. These spectra showed no evidence of branched-chain methyl loss. Each was characterized by a 106 peak due to $-S-CH_2-CH_2-CH_2-S-$ grouping and the peak resulting from alkyl chain loss.

*Analysis.*—Calcd. for $C_{27}H_{56}S_2O_2$: C, 68.00%; H, 11.83%. Found: C, 67.98%; H, 11.31%.

Major IR peaks at 2950 cm.$^{-1}$, 1460 cm.$^{-1}$, 1380 cm.$^{-1}$, 1080 cm.$^{-1}$, 1040 cm.$^{-1}$, 1020 cm.$^{-1}$, 990 cm.$^{-1}$.

The thiols useful as feeds in the present process may also be substituted, provided the substituents are relatively inert to free radical attack in the presence of the thiol and allene functionalities. Thus, alkenyl groups, acetylenic groups and the like are unsatisfactory because such are especially susceptible to free radical attack. On the other hand, hydroxyl, carboxyl, halide, ester, phenyl, naphthyl and the like known groups are relatively inert and may be present as thiol substituents. Preferably, only 1 or 2 hydrogen atoms of a thiol are replaced by

TABLE II.—COMPOUNDS MADE FROM THE REACTION OF ALLENE WITH MERCAPTANS

| R | Calculated, percent | | Found, percent | | Calculated, M.W. | Found, M.W. | $n_{25}^D$ | M.P. or B.P.° C. |
|---|---|---|---|---|---|---|---|---|
|   | C | H | C | H |   |   |   |   |
| $RSCH_2-CH=CH_2$: |   |   |   |   |   |   |   |   |
| $CH_3(CH_2)_5-$ | 68.28 | 11.46 | 68.22 | 11.38 | 158 | a 158 | 1.4668 | 69—70 (4.5 mm.). |
| $CH_3(CH_2)_7-$ | 70.90 | 11.90 | 70.85 | 11.64 | 186 | b 192 | 1.4665 | 112—114 (10 mm.). |
| $RSCH_2CH_2CH_2SR$: |   |   |   |   |   |   |   |   |
| $CH_3(CH_2)_5-$ | 65.14 | 11.66 | 65.44 | 11.44 | 276 | a 276 | 1.4856 | 126–128 (0.1 mm.). |
| $CH_3(CH_2)_7-$ | 68.60 | 12.12 | 68.59 | 11.81 | 333 | b 328 | 1.4836 | 172–174 (0.7 mm.). |
| $CH_3(CH_2)_9-$ | 71.06 | 12.44 | 70.48 | 12.03 | 388 | a 388 |  | 35.0–35.6. |
| $CH_3(CH_2)_{11}-$ | 72.90 | 12.69 | 72.78 | 12.40 | 445 | c 433 |  | 38.5–39.0. | a By mass spectroscopy.  b By freezing point depression in benzene.  c By "Thermo-Nam" in benzene.

TABLE III.—NMR AND IR OF SULFIDES MADE FROM ALLENE

| R | NMR Expressed as p.p.m. f | | | | | | Pertinent IR, cm.$^{-1}$ | | |
|---|---|---|---|---|---|---|---|---|---|
| $RSCH_2-CH=CH_2$: |   |   |   |   |   |   |   |   |   |
| $CH_3CH_2-$ | 5.3–6.0(M) | 4.86(D) a | 2.92(D) | 2.24 (Q) | 0.99(T) |  | 1,630 | 985 | 915 |
| $CH_3(CH_2)_5-$ | 5.3–6.1(M) | 4.89(D) a | 2.95(D) | 2.25(T) | 1.21(S) | 0.74(T) | 1,645 | 989 | 917 |
| $CH_3(CH_2)_7-$ | 5.4–6.1(M) | 5.05(D) a | 3.10(D) | 2.41(T) | 1.30(S) | 0.89(T) | 1,645 | 990 | 917 |
| $RSCH_2CH_2CH_2SR$: |   |   |   |   |   |   |   |   |   |
| $CH_3(CH_2)_5-$ | 2.3–2.5(M) b | 1.35(S) c | 0.88(T) |  |  |  |  |  |  |
| $CH_3(CH_2)_7-$ | 2.3–3.0(M) b | 1.29(S) c | 0.89(T) d |  |  |  |  |  |  |
| $CH_3(CH_2)_9-$ | 2.3–2.8(M) b | 1.29(S) c | 0.89(T) d |  |  |  |  |  |  |
| $CH_3(CH_2)_{11}-$e | 2.3–2.8(M) b | 1.30(S) c | 0.91(T) d |  |  |  |  |  |  | a Doublet highly split.
b Position of methylenes next to sulfur are offset slightly.
c Central methylene overlap chain methylene position.
d Typical long chain terminal methyl groups.
e NMR run in $CCl_4$.
f Downfield from tetramethylsilane.
(S)=Singlet. (D)=Doublet. (T)=Triplet. (Q)=Quartet. (M)=Multiplet.

*Examples 5–7.*—As in Examples 1–4 above, except that an aryl thiol, $C_6H_5SH$; a substituted aryl thiol, $pClC_6H_4SH$; and a saturated hydrocarbyl thiol having less than 6 carbon atoms per molecule, $C_2H_5SH$; were employed as the adducts. In each case, the product was a mixture in which the isomeric bis-hydrocarbylthiopropane-1,2 was a major component.

From a comparison of Examples 1–4 and 5–7 inclusive, it is to be noted that 1,2-diadduct product formation in the free radical catalyzed addition of thiols to allene is eliminated by the use of saturated hydrocarbyl thiols having at least 6 carbon atoms per molecule. This is particularly the case when reaction temperatures below about 100° C. are employed in the free radical catalyzed reaction effected in the presence of an inert liquid diluent. That is, a diluent which is relatively inert to free radical attack in the presence of thiols and allene.

The sulfide products of the present invention are useful per se as antioxidants, additives in lubricants, fuels and the like, as metal cation complexing agents and as chemical intermediates for the production of sulfones, sulfoxides and surfactants.

A portion of the product from Example 4, bis-dodecylthiopropane-1,3, was used as an intermediate in the preparation of the corresponding disulfoxide. To 8.88 grams (0.02 mol) of 1,3-bis-dodecylthiopropane in 80 ml. of glacial acetic acid was added 1.5 grams (0.0397 mol) of 90% hydrogen peroxide; 50 ml. of methylene chloride was added and the mixture stirred for 30 minutes. Methylene chloride was used to extract the disulfoxide. Recrystallization from methylene chloride gave a white solid M.P. 126.4–129.0° C.

such substituents. Representative substituted thiols are $HS(CH_2)_6OH$, $Br-(CH_2)_7SH$,
$HO_2CCH_2CH(CH_3)-(CH_2)_3SH$ and the like. All known substituent groups which are satisfactory as substituents of the hydrocarbyl thiols of the present invention demonstrate a negative free radical relative reactivity test. That is, in the test reaction product, for all practical purposes, only n-hexylthiol has adducted to allene under the following test conditions:

| | |
|---|---|
| Temperature, ° C. | 50 |
| Allene, mol | 0.1 |
| n-Hexyl thiol | 0.2 |
| n-Hexyl-X | 0.2 |
| Azobis-isobutyronitrile, gram | 1 |
| Time, hours | 0.2 |
| Pressure | Autogenous | where "X" is the substituent group. Under the test conditions, all satisfactory substituent groups show no appreciable reactivity towards allene.

The foregoing descriptive embodiments of the present invention are illustrative only. It is not the intent that the invention shall be construed as limited to the details of the description, except as insofar as such limitations have been included in the terms of the following claims.

What is claimed is:

1. Process for the production of bis-hydrocarbyl thiopropane-1,3 compounds in a liquid phase reaction which comprises reacting allene with a thiol of the formula

RSH wherein R is a saturated hydrocarbon radical containing from 6 to 18 carbon atoms, inclusive, wherein said reaction is catalyzed by free radicals at a temperature in the range 50–60° C., at a pressure sufficient to maintain said liquid phase and at a mol ratio of said thiol to allene of at least about 2; thereby producing the corresponding bis-R-thiopropane-1,3 compound.

2. The process of claim 1 wherein said reaction is carried out in the presence of an inert organic liquid diluent.

3. The process of claim 1 wherein said ratio is in the range 1.8–2.2, respectively.

4. The process of claim 1 wherein a hydrogen atom of said hydrocarbon radical is replaced by an inert substituent group.

References Cited by the Examiner

UNITED STATES PATENTS

| 2,610,981 | 9/1952 | Short | 260—609 |
| 2,951,874 | 9/1960 | Worrel | 260—609 |
| 3,005,852 | 10/1961 | Freyermuth et al. | 260—607 |
| 3,006,963 | 10/1961 | Buc et al. | 260—607 |

OTHER REFERENCES

Van Der Ploeg et al.: Recueil des Travaux Chemiques des Pays-Bas, T.81 775–781 (July, 1962).

CHARLES B. PARKER, *Primary Examiner.*

DELBERT R. PHILLIPS, *Assistant Examiner.*